(12) United States Patent
Claessen

(10) Patent No.: US 8,878,674 B2
(45) Date of Patent: Nov. 4, 2014

(54) ITEM CHECKOUT DEVICE WITH ANTENNA

(75) Inventor: Albertus M. Claessen, Oakwood, GA (US)

(73) Assignee: NCR Corporation, Duluth, GA (US)

( * ) Notice: Subject to any disclaimer, the term of this patent is extended or adjusted under 35 U.S.C. 154(b) by 1971 days.

(21) Appl. No.: 11/867,080

(22) Filed: Oct. 4, 2007

(65) Prior Publication Data

US 2009/0091449 A1   Apr. 9, 2009

(51) Int. Cl.
*G08B 13/14*   (2006.01)
*H01Q 9/04*    (2006.01)
*G06K 7/10*    (2006.01)
*H01Q 13/10*   (2006.01)

(52) U.S. Cl.
CPC .......... *G06K 7/10346* (2013.01); *H01Q 9/0414* (2013.01); *H01Q 9/0457* (2013.01); *H01Q 9/0428* (2013.01); *G06K 7/10178* (2013.01); *H01Q 13/10* (2013.01)
USPC ........................ 340/572.1; 340/10.1; 340/505

(58) Field of Classification Search
USPC ............ 340/572.1, 10.1, 568.7, 572.8, 572.4, 340/10.6
See application file for complete search history.

(56) References Cited

U.S. PATENT DOCUMENTS

| | | | | |
|---|---|---|---|---|
| 6,546,795 | B1* | 4/2003 | Dietz | 73/290 R |
| 7,247,802 | B1* | 7/2007 | Minter | 177/25.15 |
| 7,619,527 | B2* | 11/2009 | Friend et al. | 340/572.3 |
| 7,658,331 | B1* | 2/2010 | Barron | 235/462.1 |
| 2003/0214443 | A1* | 11/2003 | Bauregger et al. | 343/700 MS |
| 2004/0000591 | A1* | 1/2004 | Collins et al. | 235/462.14 |
| 2004/0102870 | A1* | 5/2004 | Andersen et al. | 700/215 |
| 2004/0220860 | A1* | 11/2004 | Persky et al. | 705/23 |
| 2005/0099300 | A1* | 5/2005 | Acosta et al. | 340/572.3 |
| 2006/0001576 | A1* | 1/2006 | Contopanagos | 343/702 |
| 2006/0208899 | A1* | 9/2006 | Suzuki et al. | 340/572.7 |
| 2006/0220787 | A1* | 10/2006 | Turner et al. | 340/5.61 |
| 2007/0096919 | A1* | 5/2007 | Knadle et al. | 340/572.8 |
| 2007/0102513 | A1* | 5/2007 | Scheb | 235/383 |
| 2008/0120193 | A1* | 5/2008 | Schuller et al. | 705/23 |

* cited by examiner

*Primary Examiner* — Travis Hunnings
(74) *Attorney, Agent, or Firm* — Paul W. Martin; Peter H. Priest; Harden E. Stevens, III

(57) ABSTRACT

An item checkout device with antenna which provides better overlap between barcode label and radio frequency identification (RFID) label reader reading zones. The antenna may be flush mounted within an aperture of a weigh plate and be electrically isolated from a remainder of weigh plate by an insulator. The antenna may include a section of the weigh plate that has been removed, reduced in size to accommodate the insulator, and inserted into the weigh plate. The antenna may be wirelessly coupled to the RFID label reader to avoid placing any mechanical load on the weigh plate.

21 Claims, 5 Drawing Sheets

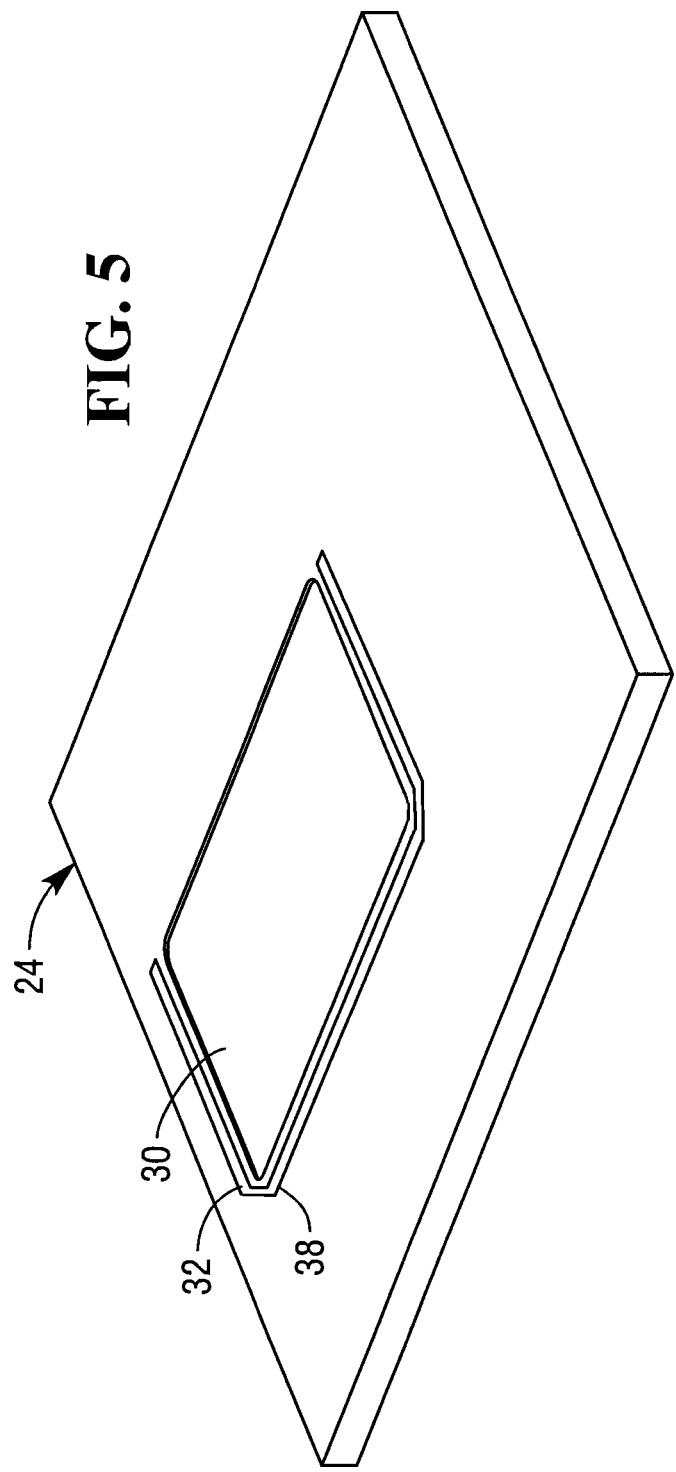

ITEM CHECKOUT DEVICE WITH ANTENNA

BACKGROUND

Barcode scanners are well known for their usefulness in identifying products. Barcode scanners may be equipped with add-on radio frequency identification (RFID) label readers, but barcode label and RFID label reading zones do not coincide, resulting in operator confusion as to item placement. Further, finding space for a RFID label reader antenna is a challenge.

It would be desirable to better integrate RFID label readers with barcode scanners and provide better overlap between barcode label and RFID label reading zones.

SUMMARY

An item checkout device with antenna is provided.

The antenna may be flush mounted within an aperture of the weigh plate and electrically isolated from a remainder of the weigh plate by an insulator. The antenna may include a section of the weigh plate that has been removed, reduced in size to accommodate the insulator, and inserted into the weigh plate.

In a preferred example, the antenna is wirelessly coupled to a radio frequency identification (RFID) label reader to avoid placing any mechanical load on the weigh plate.

BRIEF DESCRIPTION OF THE DRAWINGS

FIG. 5 is a view illustrating another example antenna configuration.

DETAILED DESCRIPTION

Figure 1:
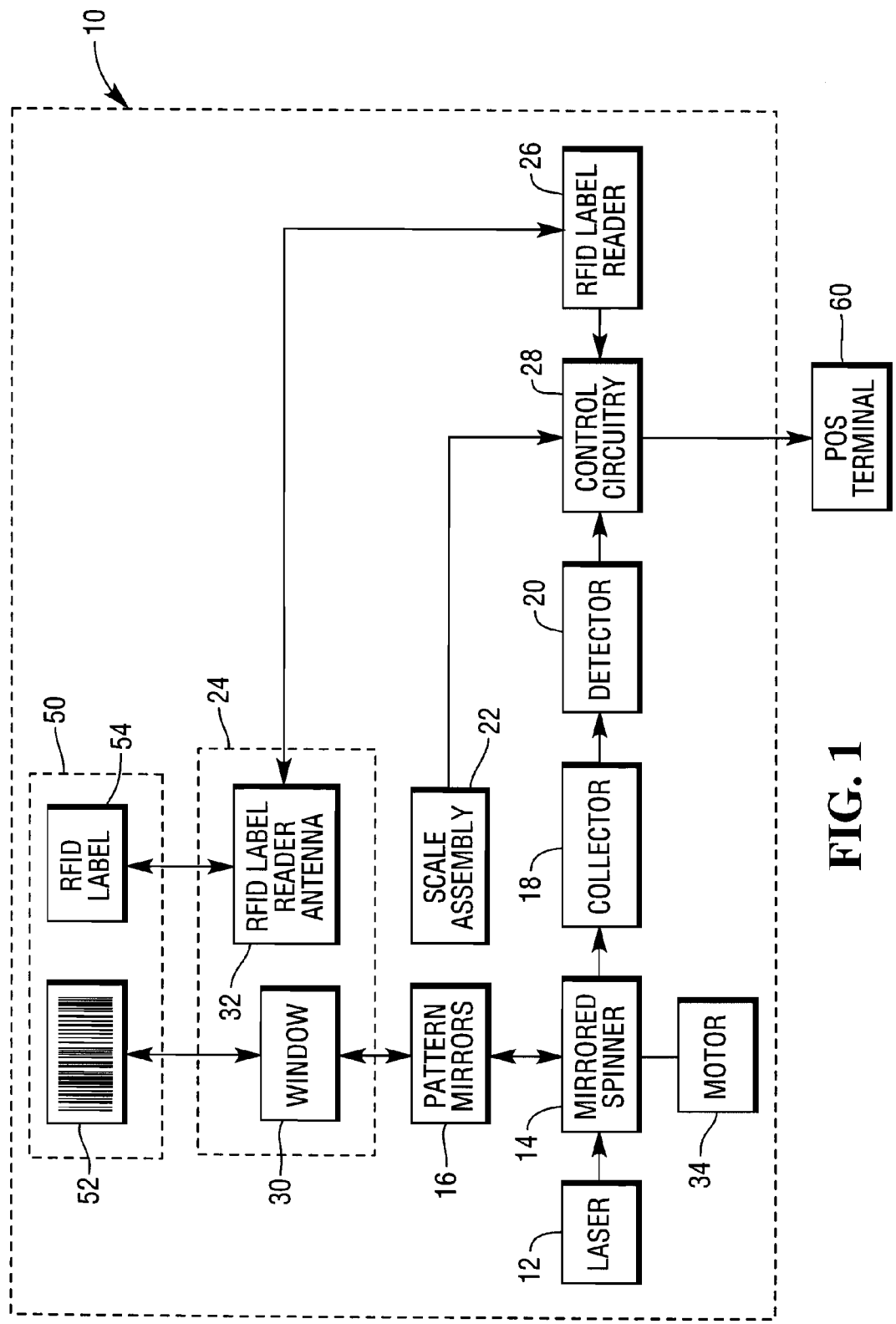
FIG. 1 is a block diagram of an example item checkout device.

Referring now to FIG. 1, example item checkout device includes laser 12, mirrored spinner 14, pattern mirrors 16, collector 18, detector 20, scale assembly 22, weigh plate 24, radio frequency identification (RFID) label reader 26, and control circuitry 28.

Laser 12 generates a laser beam.

Mirrored spinner 14 directs the laser beam towards pattern mirrors 16 and directs light reflected from item 50 towards collector 18. Motor 34 rotates mirrored spinner 28. Pattern mirrors 16 produce a pattern of scanning light beams for scanning barcode label 52 on item 50. Pattern mirrors 16 direct the laser beam through window 30 in weigh plate 24 towards item 50 and direct the light reflected from item 50 towards mirrored spinner 16.

Collector 18 directs the light reflected from item 50 towards detector 20.

Detector 20 converts the light reflected from item 50 into electrical signals.

Scale assembly 22 produces electrical signals based upon the weight of produce items placed on weigh plate 24. Scale assembly 22 may include a load cell or other weight measuring device.

Item 50 may be labeled only with barcode label 52, only with RFID label 54, or both.

RFID label reader 26 wirelessly interrogates RFID label 54 on item 50. RFID label reader 26 couples to RFID label reader antenna 32.

Control circuitry 28 controls operation of item checkout device 10. Control circuitry 28 receives electrical signals from detector 20 and determines item identification information stored within barcode label 52. Control circuitry 28 receives weight signals from scale assembly 22. Control circuitry 28 receives item identification information stored within RFID label 54 from RFID label reader 26. Control circuitry 28 sends weight information and item identification information to point-of-sale (POS) terminal 60.

POS terminal 60 determines a price of item 50 based upon the item identification information. POS terminal 60 also determines prices of produce items based upon the weight information and produce identification information entered into POS terminal 60 by an operator.

Figure 2:
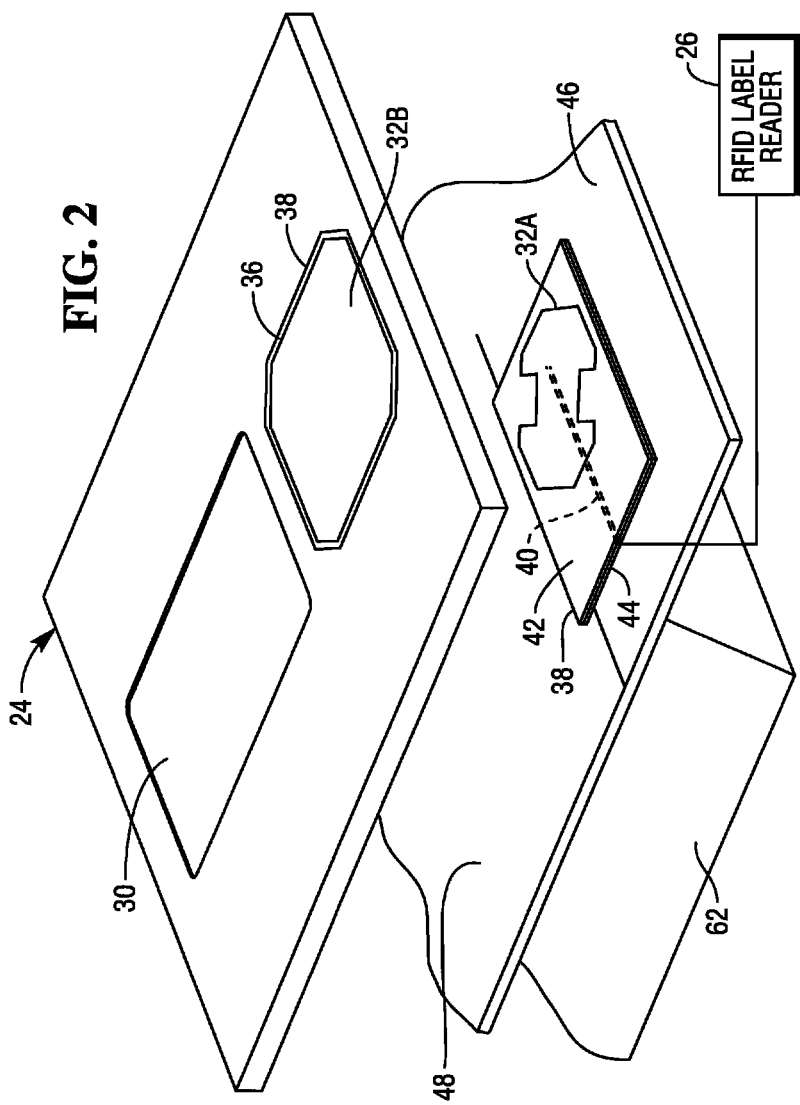
FIG. 2 is a view illustrating an example antenna configuration.

With reference to FIG. 2, a first example RFID label reader antenna 32 is illustrated.

RFID label antenna 32 includes two portions 32A and 32B. Antenna portion 32A is connected to RFID label reader and is located underneath weigh plate 24. Antenna portion 32B is part of weigh plate weigh plate 24, in a position directly above antenna portion 32A.

Antenna portions 32A and 32B form a circularly polarized antenna. The operating frequency is in the Industrial, Scientific, and Medical (ISM) band from 902-928 MHz (center frequency 915 MHz). The sizes of antenna portions 32A and 32B are about a half a wavelength square, in this case, about 6.5 inches by 6.5 inches.

Antenna portions 32A and 32B couple wirelessly. Antenna portion 32B acts as a resonator for the RF signal from antenna portion 32A.

Wireless coupling, as opposed to connecting RFID label reader 26 to weigh plate 24 with a wire, avoids placing any mechanical load on weigh plate 24. The weight information reported by scale assembly 22 is not affected by antenna portions 32A and 32B.

The orientation of antenna portions 32A and 32B results in an antenna pattern that points upward with minimum radiation to the sides. This limits the RFID reading zone to approximately the barcode scanning zone, such that RFID labels on items in shopping carts or over scanners in adjacent lanes are not read by RFID label reader 28.

In more detail, antenna portion 32A as illustrated is mounted to a top layer 42 of printed circuit board 38. Antenna portion 32A is fed with a microstrip transmission line 40 on the layer 44 below. Microstrip transmission line 40 wirelessly couples to antenna portion 32A.

Antenna portion 32A may be of any arbitrary design and may be fed with a wired or wireless connection to microstrip transmission line 40, a coax cable, or any other conductor suitable for RFID label reader 26.

Antenna portion 32B may be cut out from a cutout from weigh plate 24. The cutout is slightly reduced in size and reinserted within aperture 38 with a ring 36 of insulating or non-conductive glue around the perimeter in order to achieve electrical isolation from the rest of weigh plate 24. Antenna portion 32B remains flush with the top surface of weigh plate 24.

Antenna portion 32B is illustrated as having a generally octagonal shape. Other shapes are also envisioned.

Antenna portions 32A and 32B would normally be placed close to the resonating patch to maximize coupling and efficiency, but placement at a larger distance is also possible. The size of the RFID read zone may be controlled by adjusting the output power from RFID label reader 26.

Antenna portion 32B may be located anywhere around window 30 without obscuring the laser beam or returning light from entering or leaving optics cavity 48. The illustrated location is between window 30 and an operator end of device 10. Housing 62 of item checkout device 10 may be manufactured to provide shelf area 46 underlying weigh plate 24 for mounting printed circuit board 38.

Figure 3:
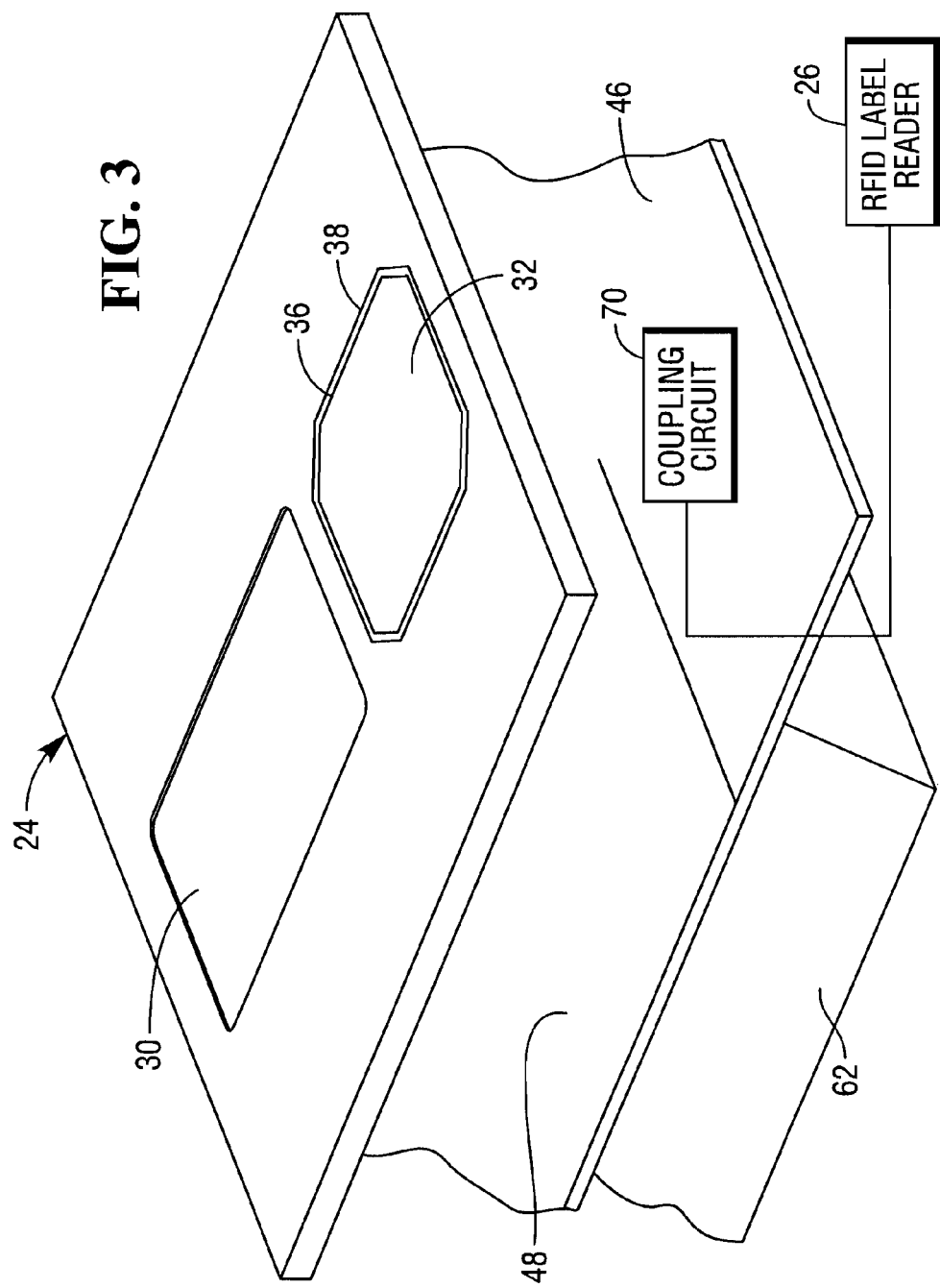
FIG. 3 is a view illustrating another example antenna configuration.

With reference to FIG. 3, a second embodiment is illustrated in which the antenna 32 in weigh plate 24 is driven by coupling circuit 70. Coupling circuit 70 may be capacitive or inductive.

Figure 4:
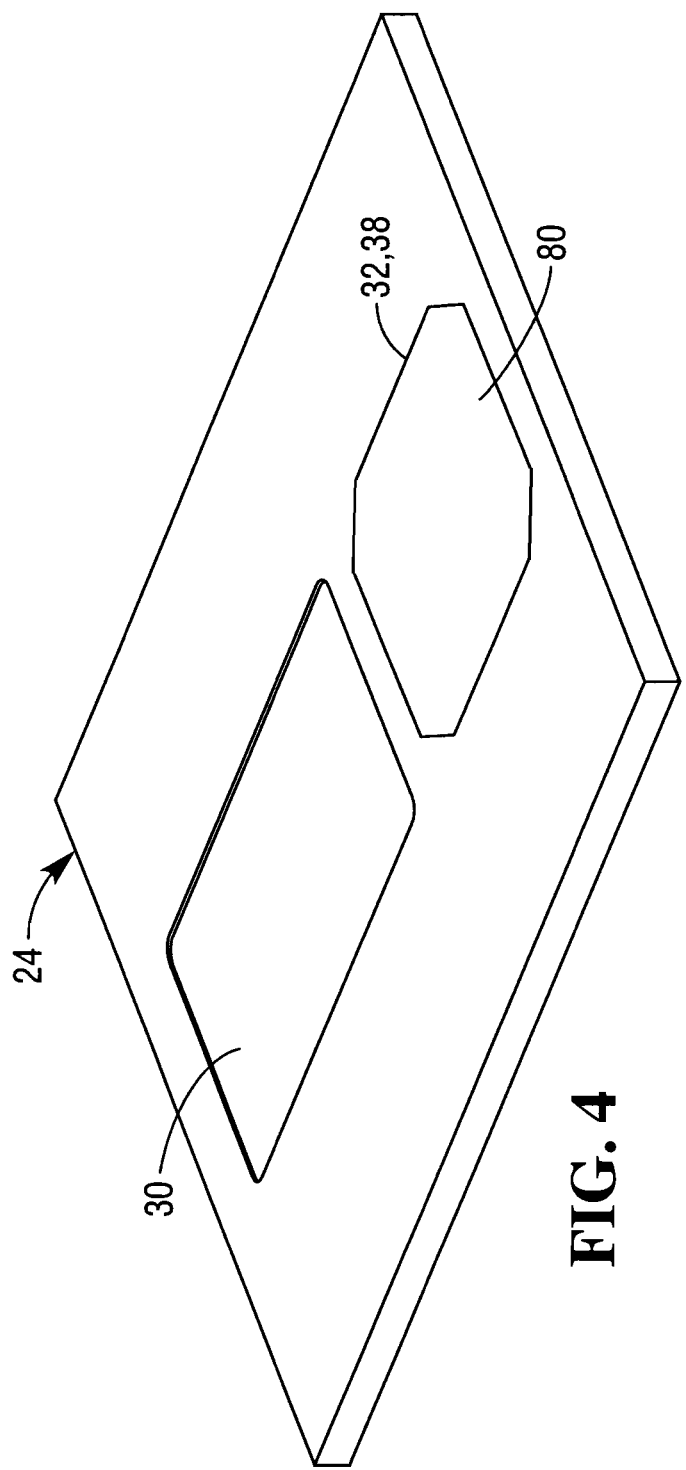
FIG. 4 is a view illustrating another example antenna configuration.

With reference to FIG. 4, a third embodiment is illustrated in which the antenna 32 is an aperture antenna. The radiating element is not an area of weigh plate 24, but is aperture 38 in weigh plate 24. Radiation is caused by currents around aperture 38. Aperture 38 is filled with a blank 80 made of a non-conductive material, such as plastic.

Other shapes are also envisioned, such as a simple slot, a square, a circle, or a ring shape.

Antenna 32 may be excited by either of the methods in FIGS. 2 and 3.

FIG. 5 illustrates an alternate location and an alternate shape for antenna 32. The shape is generally in the form of a letter "C", and the location is around window 30.

Antenna 32 may be any of the types in FIGS. 2 and 4, and may be excited by either of the methods in FIGS. 2 and 3.

Although particular reference has been made to certain embodiments, variations and modifications are also envisioned within the spirit and scope of the following claims.

The invention claimed is:

1. A radio frequency identification label reader antenna for communicating with a radio frequency identification label, the antenna comprising a first portion within a weigh plate suitable for operation with a scale of an item checkout device and a second portion external to the weigh plate and adapted to excite the first portion of the antenna where only the first portion of the antenna communicates with the radio frequency identification label.

2. The radio frequency identification label reader antenna of claim 1, wherein the first portion is flush mounted within the weigh plate.

3. The radio frequency identification label reader antenna of claim 1, wherein the first portion is mounted within an aperture in the weigh plate.

4. The radio frequency identification label reader antenna of claim 1, wherein the first portion is an aperture antenna in the weigh plate.

5. The radio frequency identification label reader antenna of claim 1, further comprising an insulator between the first portion and a remainder of the weigh plate.

6. The radio frequency identification label reader antenna of claim 1, wherein the first portion comprises a section of the weigh plate.

7. The radio frequency identification label reader antenna of claim 1, wherein the first portion has a size of about half a wavelength.

8. The radio frequency identification label reader antenna of claim 1, wherein the first portion is wirelessly coupled to the second portion.

9. A weigh plate suitable for operation with a scale of an item checkout device, the weigh plate comprising a portion of a radio frequency identification label reader antenna, the antenna comprising a first portion within the weigh plate and a second portion external to the weigh plate where the two antenna portions are wirelessly coupled and only the first portion of the antenna communicates with a radio frequency identification label.

10. The weigh plate of claim 9, wherein the first portion of the antenna is mounted within an aperture in the weigh plate.

11. The weigh plate of claim 9, wherein the first portion of the antenna is an aperture antenna in the weigh plate.

12. The weigh plate of claim 9, further comprising an insulator between the first portion of the antenna and a remainder of the weigh plate.

13. The weigh plate of claim 9, wherein the first portion of the antenna comprises a section of the weigh plate.

14. An item checkout device comprising:
a barcode scanner;
a scale in the barcode scanner;
a weigh plate on the scale;
an antenna including a first antenna portion within the weigh plate and a second antenna portion external to the weigh plate adapted to excite the first antenna portion;
a radio frequency identification label reader coupled to the second portion; and
where only the first antenna portion communicates with a radio frequency identification label.

15. The item checkout device of claim 14, wherein the first antenna portion is flush mounted within the weigh plate.

16. The item checkout device of claim 14, wherein the first antenna portion is mounted within an aperture in the weigh plate.

17. The item checkout device of claim 14, wherein the first antenna portion is an aperture antenna in the weigh plate.

18. The item checkout device of claim 14, further comprising an insulator between the first antenna portion and a remainder of the weigh plate.

19. The item checkout device of claim 14, wherein the first antenna portion comprises a section of the weigh plate.

20. The item checkout device of claim 14, wherein the first antenna portion has a size of about half a wavelength.

21. The item checkout device of claim 14, wherein the first antenna portion is wirelessly coupled to the second antenna portion.

* * * * *